United States Patent
Szeto et al.

(10) Patent No.: US 7,120,672 B1
(45) Date of Patent: Oct. 10, 2006

(54) METHOD AND SYSTEM FOR SHARING INFORMATION IN AN INSTANT MESSAGING ENVIRONMENT

(75) Inventors: Christopher Tzann-en Szeto, Santa Clara, CA (US); Justin Everett-Church, Fremont, CA (US); Stephanie Bergman, Mountian View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 10/729,818

(22) Filed: Dec. 5, 2003

Related U.S. Application Data

(63) Continuation-in-part of application No. 09/930,878, filed on Aug. 15, 2001.
(60) Provisional application No. 60/519,772, filed on Nov. 12, 2003.

(51) Int. Cl.
 *G06F 15/16* (2006.01)
 *G06F 13/00* (2006.01)
(52) U.S. Cl. ............... 709/206; 709/202; 709/204; 709/227; 715/751; 715/758; 707/104.1
(58) Field of Classification Search ........ 709/201–207, 709/227–228, 246–247; 707/3, 10, 104.1; 455/518–519; 715/751–753, 758, 761
 See application file for complete search history.

(56) References Cited

U.S. PATENT DOCUMENTS

| | | | | |
|---|---|---|---|---|
| 5,220,657 A * | 6/1993 | Bly et al. | ............ | 709/205 |
| 5,880,731 A | 3/1999 | Liles et al. | | |
| 6,237,025 B1 * | 5/2001 | Ludwig et al. | ............ | 709/204 |
| 6,301,609 B1 | 10/2001 | Aravamudan et al. | | |
| 6,430,602 B1 | 8/2002 | Kay et al. | ............ | 709/206 |
| 6,487,583 B1 | 11/2002 | Harvey et al. | | |
| 6,493,724 B1 * | 12/2002 | Cusack et al. | ............ | 707/104.1 |
| 6,539,421 B1 * | 3/2003 | Appelman et al. | ............ | 709/206 |
| 6,564,246 B1 * | 5/2003 | Varma et al. | ............ | 709/205 |
| 6,564,249 B1 * | 5/2003 | Shiigi | ............ | 709/206 |
| 6,611,814 B1 * | 8/2003 | Lee et al. | ............ | 705/26 |
| 6,651,053 B1 * | 11/2003 | Rothschild | ............ | 707/3 |
| 6,677,976 B1 | 1/2004 | Parker et al. | ............ | 348/14.08 |
| 6,747,970 B1 * | 6/2004 | Lamb et al. | ............ | 370/352 |
| 6,760,580 B1 | 7/2004 | Robinson et al. | ............ | 455/412.2 |
| 6,781,608 B1 | 8/2004 | Crawford | | |
| 6,807,565 B1 | 10/2004 | Dodrill et al. | ............ | 709/206 |
| 6,816,884 B1 * | 11/2004 | Summers | ............ | 709/206 |
| 6,907,447 B1 * | 6/2005 | Cooperman et al. | ............ | 709/203 |
| 6,980,983 B1 | 12/2005 | Banerjee et al. | | |
| 6,983,370 B1 | 1/2006 | Eaton et al. | | |
| 7,028,262 B1 | 4/2006 | Estrada et al. | | |
| 2003/0041108 A1 | 2/2003 | Henrick et al. | | |
| 2003/0101235 A1 | 5/2003 | Zhang | | |
| 2003/0208545 A1 * | 11/2003 | Eaton et al. | ............ | 709/206 |
| 2004/0117443 A1 | 6/2004 | Barsness | | |
| 2004/0215731 A1 | 10/2004 | Tzann-en Szeto | | |
| 2005/0086211 A1 * | 4/2005 | Mayer | ............ | 707/3 |

OTHER PUBLICATIONS corp.odigo.com/products/clients Web Page.
apple.com/quicktime/ Web Page.
International Searching Authority, "Notification of the Transmittal pf the International Search Report and the Written Opinion of the International Searching Authority, or the Declaration," PCT/US04/21209, dated Aug. 9, 2005, 9 pages.

(Continued)

*Primary Examiner*—Bharat Barot
(74) *Attorney, Agent, or Firm*—Hickman Palermo Truong & Becker LLP

(57) ABSTRACT

A technique for providing a wish list is disclosed. The technique comprises displaying the wish list, modifying the wish list, and sending substantially in real-time information associated with the wish list.

28 Claims, 4 Drawing Sheets

OTHER PUBLICATIONS

Current Claims, PCT/US04/21209, 5 pages.
"Private-Label Instant Messaging Clients", Odigo Inc.. Retrieved from the Internet: corp.odigo.com/products/clients downloaded Oct. 9, 2001.
"Quicktime", Apple Computer, Inc. (2001) Retrieved from the Internet. apple.com/quicktime/ downloaded Oct. 10, 2001.

International Searching Authority, "Notification of transmittal of the international search report and the written opinion of the international searching authority, or the declaration," International Application No. PCT/US2004/038354, dated Apr. 19, 2005, 13 pages.
Current Claims, PCT/US2004/038354, 3 pages.

* cited by examiner

METHOD AND SYSTEM FOR SHARING INFORMATION IN AN INSTANT MESSAGING ENVIRONMENT

CROSS REFERENCE TO RELATED APPLICATIONS

This application claims priority to U.S. Provisional Patent Application No. 60/519,772 entitled WISH LIST filed Nov. 12, 2003 which is incorporated herein by reference for all purposes.

This application is a continuation in part of co-pending U.S. patent application Ser. No. 09/930,878 entitled INSTANT MESSAGING ENVIRONMENTS filed Aug. 15, 2001, which is incorporated herein by reference for all purposes.

FIELD OF THE INVENTION

The present invention relates generally to communications systems and applications. More specifically, a technique for sharing information among users is disclosed.

BACKGROUND OF THE INVENTION

Instant messaging has become one of the most popular applications on the Internet. Instant messaging programs generally allow users to send and receive messages. The messages are typically generated and displayed by an instant messaging application on each end and an instant messaging server may perform various functions to facilitate the transfer of messages for communication or conversation.

Software intended for implementing an instruction set in an instant messaging environment may be generally referred to as an instant messenger (IM) application. Existing IM applications typically allow limited data exchanges such as text messages. It would be desirable if the users could share more information about themselves via IM applications in an interactive way. It would also be useful if the sharing of information can be provided via a user interface that is easy to use.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A technique for sharing information between two or more users is disclosed. In some embodiments, information, such as a wish list is modified and information associated with the wish list is sent. In some embodiments, the wish list information is sent from the device of the wish list owner to the device of the recipient. The wish list may be stored locally on the device to reduce latency. In some embodiments, the wish list information includes a search phrase, which may be used to display the wish list on the recipient's device.

Figure 1:
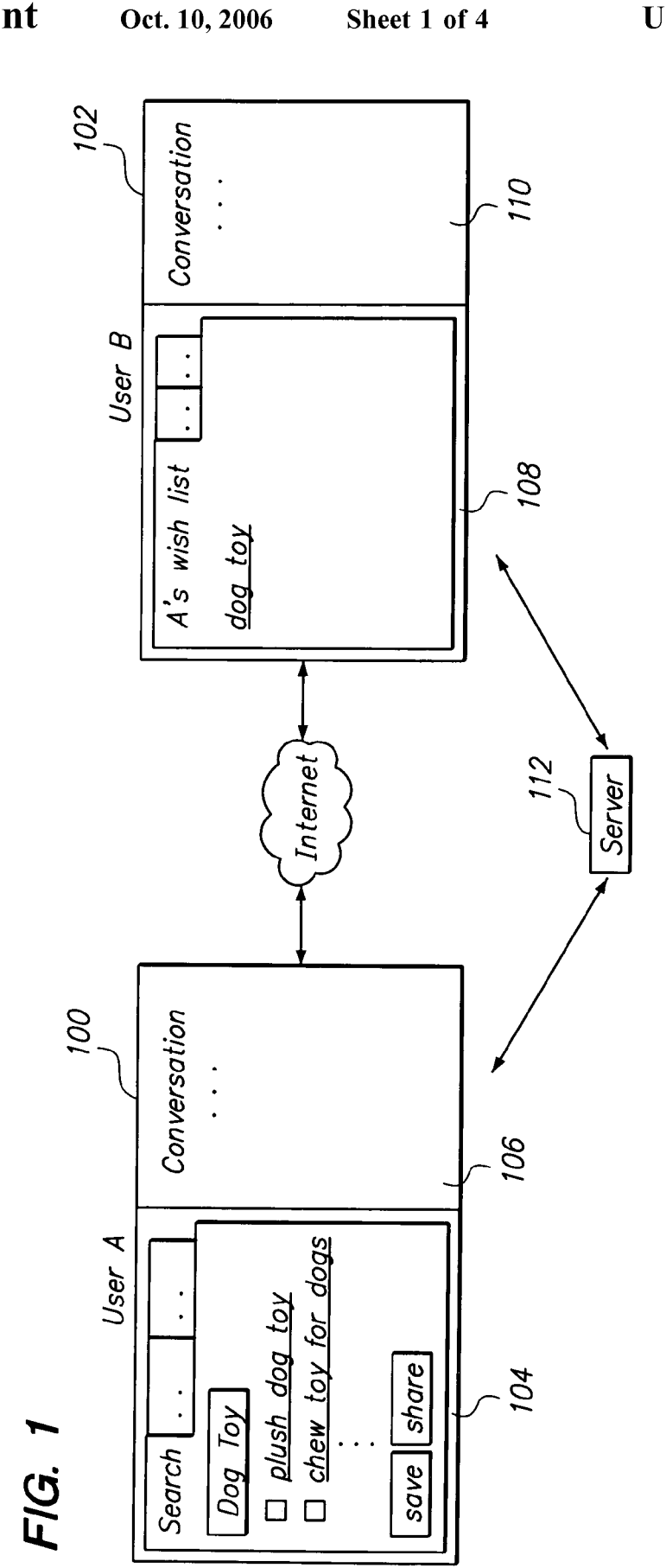
FIG. 1 is a diagram illustrating the sharing of information, such as a wish list, between users according to one embodiment.

FIG. 1 is a diagram illustrating the sharing of information, such as a wish list, between users according to one embodiment. As used herein, a wish list refers to information specific to a user, such as a data structure used to track items desired by or of interest to the user. A wish list may be empty, or it may include one or more items. The items may be objects as well as non-physical concepts or ideas such as categories or classes of things. In various embodiments, a wish list may be implemented as a list, a table, a tree, or any appropriate data structures of combinations thereof.

In the example shown in FIG. 1, users A and B communicate with each other via the Internet using instant messaging (IM) applications 100 and 102, respectively. As used herein, the term "application" is intended to refer to any client application, server application, distributed application, self contained application or combination thereof. An application may be implemented in any appropriate manner, including being embedded in a chip or being loaded into memory or firmware. While this description refers extensively to instant messaging applications, the disclosed techniques can also be applied to other messaging applications or systems in different embodiment. In general, an instant messaging application refers to any real-time or near real-time messaging or information exchange application such as mobile phone messaging or wireless device messaging. Instant messaging applications include applications that buffer messages sent to a participant who is temporarily unavailable or offline.

The techniques are applicable to messaging applications running on a variety of devices, including personal computers, handheld devices, mobile telephones, wireless devices or any other appropriate platforms and/or systems. Throughout this specification, for ease of reference, the Internet is referred to as a medium over which messages are sent, although other mediums can also be used. The disclosed system also operates over any other appropriate networks including wireless networks, proprietary networks, intranets, local area networks, or wide area networks.

The user interface may be presented differently for different IM applications. In the example shown in FIG. 1, the user interfaces of the IM application 100 and 102 each includes a conversation window (106 and 110, respectively) used to display text messages or conversations. User interfaces 100 and 102 also include environment-specific windows 104 and 108, respectively. Each user may individually perform functions such as search, browse, shopping, etc. in the environment-specific area without showing the changes to the other user. The user may also selectively share the contents in the environment-specific area with the other user. In this example, User A may share his wish list with User B. Details of the sharing are discussed below.

Figure 2:
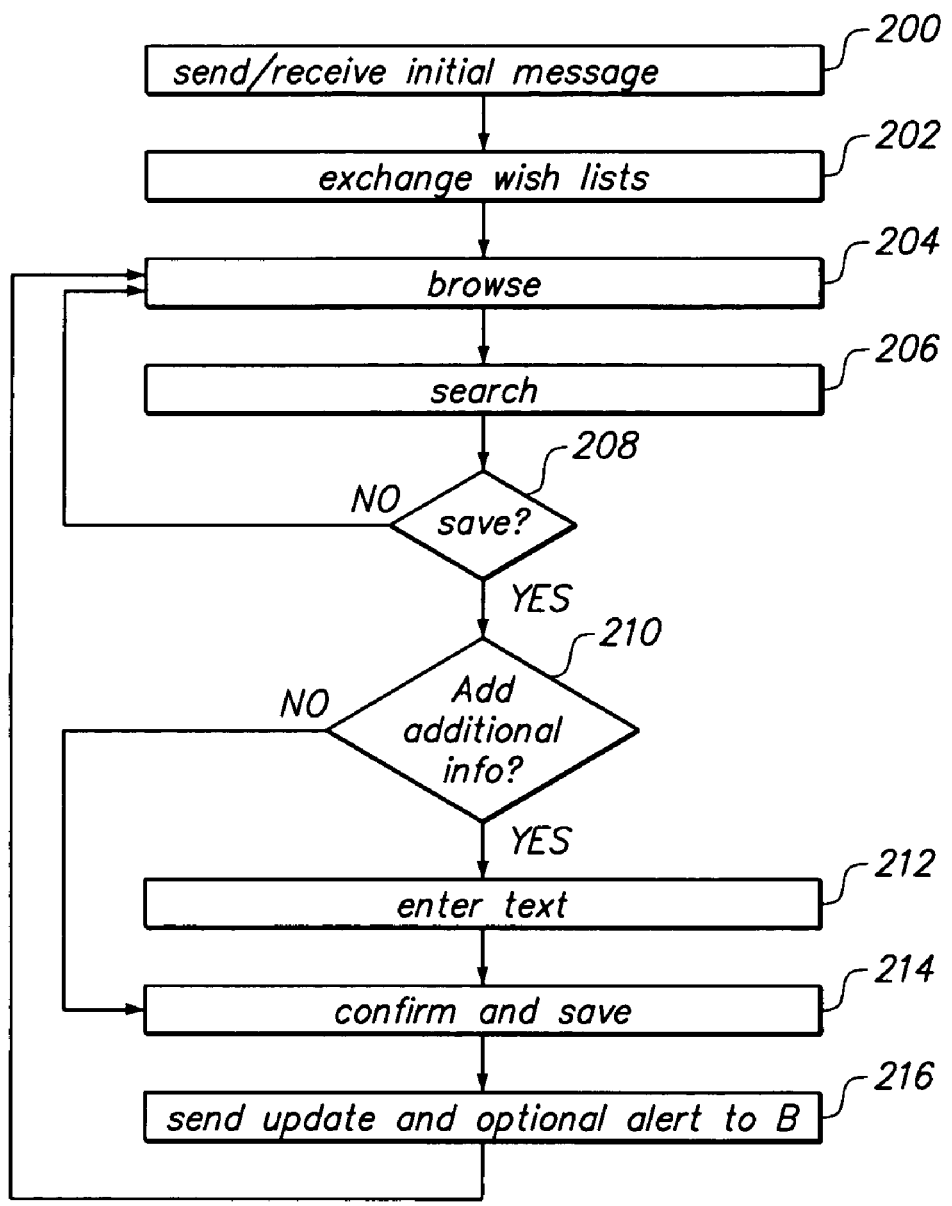
FIG. 2 is a flowchart illustrating the sharing of a wish list between users according to one embodiment.

FIG. 2 is a flowchart illustrating the sharing of information, such as a wish list, between users according to one embodiment. In this example, User A shown in FIG. 1 generates a wish list and shares it with User B. The two users start their instant messaging session by sending or receiving an initial message using their IM applications (200). The users are ready to exchange their wish lists at this point. In some embodiments, additional authentication may take place before the wish lists are exchanged. For example, to provide better privacy protection, the user may be able to share his wish list with certain users and not the others. If the other user does not have permission to view the wish list, the wish list is then not sent to the other user at session initialization time. In some embodiments, a user may create different types of wish lists for different groups of people. For example, a user may create separate wish lists for friends, family and co-workers. Additional checking may be performed to select an appropriate wish list to show to the other user. In some embodiments, a user may subscribe to the wish lists of certain users. An IM server may transfer the changes in the subscribed wish lists to the user even if the user is offline when the changes occurred.

In the example shown in FIG. 2, it is assumed that both User A and User B are permitted to view the each other's wish list. The wish list for each user is stored locally on the user's device. Once the IM session initializes, the wish lists are exchanged (202). While the IM session is in progress, User A may be engaged in a conversation with User B while concurrently performing browse functions in his environment-specific window (204). While browsing, User A may perform a search to locate items of interest (206).

There are several ways to perform this search. In some embodiments, User A's environment specific window provides a special search page that allows the user to type in a search phrase. The search phrase includes one or more words and/or expressions that can be used to conduct a search. The IM application then sends the search phrase via the Internet to a server such as 112 shown in FIG. 1. The server may be a database, an application server or any other appropriate devices that can locate items corresponding to the search phrase and return the search results to the application. In this example, the server directly carries out the search and provides the search results. In some embodiments, the server may relay the search request on to a different device. The search results are then displayed in the user interface of User A's IM application. In some embodiments, the search may be performed by sending a query to a search engine on the Internet, and the IM application user interface may display the results returned by the search engine. The search results may be reformatted by the IM application before they are displayed.

User A is then given an option to save the search result (208). In some embodiments, the user can save the search results by pressing a save button associated with the environment-specific window. If the user chooses not to save the search results, he may continue to browse and/or repeat the search process, and the unsaved search results may be overwritten. If, however, the user chooses to save the search result, he may be optionally offered an opportunity to add additional information or comment to the search (210). This option may be presented to the user as a dialog box or other appropriate input interface. If the user chooses to do so, he may enter additional text or other appropriate information in the interface provided (212). The user's intention to save is then confirmed, and both the search results as well as the additional information are saved (214). The confirmation is optional and may not be displayed in some embodiments. In some embodiments, the search phrase is saved instead of the search results. Thus, a new search is performed on the saved search phrase to display the currently available items next time User A starts a new IM session. After the wish is saved, an update is sent to User B (216). In some embodiments, the update includes just the changed portion of the wish list. In some embodiments, the update includes the entire wish list. Optionally, an alert may also be sent to User B (216). User A then returns to browse mode and may perform other searches (204).

Returning to FIG. 1 as an example, User A enters a search with a search phrase "dog toy". In the search window, a number of search results such as "plush dog toy" and "chew toy for dogs" are listed. In some embodiments, the search phrase "dog toy" is sent to User B as User A's wish list information. This search phrase represents items in user A's wish list in a compressed form. The IM application on User B's device can later obtain more details about the items in A's wish list using this information. Details of how User A's wish list information is processed by User B's IM application is discussed in more detail later.

In this example, when User A's wish list changes, the change is pushed to user B's IM application in approximately real-time. User A and User B are both connected to an Instant Messaging server in this example. The changes are sent instantaneously over the network connection provided by the Instant Messaging service. Other instant messaging protocols and architectures can also be used. In this embodiment, the two users are constantly provided with the most current information about the other's wishes, and may react to the information instantly. For example, the wish list may be integrated with an e-commerce or shopping web site. The items in the wish list may be links to actual items available for sale. The user may place the items in a virtual shopping cart and make purchases. As a result, the interactivity of the IM session is enhanced.

Figure 3:
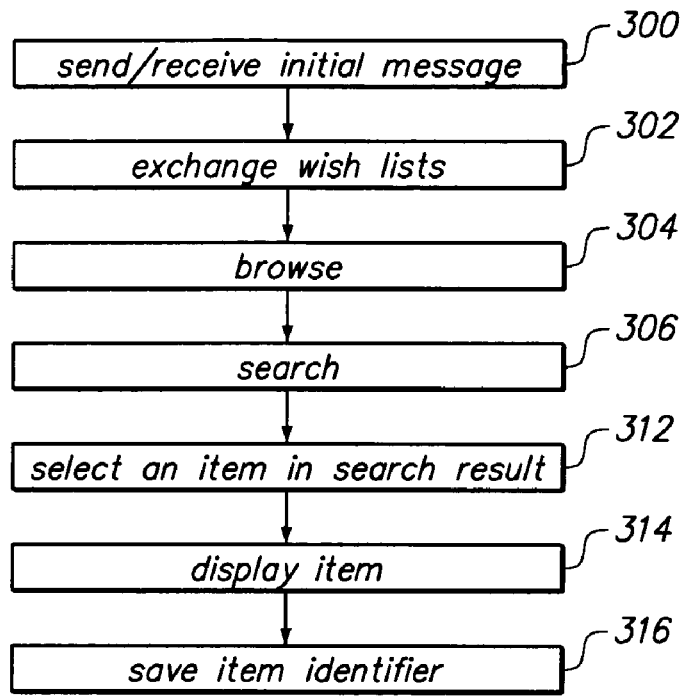
FIG. 3 is a flowchart illustrating a process for saving a single item in the search results according to one embodiment.

In some embodiments, instead of saving the search phrase or the entire search results in the wish list, items in the search result may be individually saved to the wish list. FIG. 3 is a flowchart illustrating a process for saving a single item in the search results according to one embodiment. In this example, users A and B initialize their IM session by sending or receiving an initial message (300). The wish list of the users are then exchanged (302). While the session is in progress, User A may enter browse mode (304). The user may search for items of interest by selecting a search page within the environment-specific window (306). Returning to the example shown in FIG. 1, User A performs a search with a key phrase "dog toy". In the search window, a number of search results such as "plush dog toy" and "chew toy for dogs" are displayed in the search window. The user may select one of the items in the search result by clicking on a link for the item (312). Once the item is displayed in the IM environment (314), the user can choose to select an item to add to his wish list. In some embodiments, an item is added by selecting an interface element such as a button or check box. Information associated with the item, such as item identifier or item description is then saved locally on User A's machine (316). In some embodiments, the item identifier includes a stock keeping unit (SKU) number or a product identifier. The identifier is saved and can be used later to retrieve the corresponding item from the search database.

Figure 4:
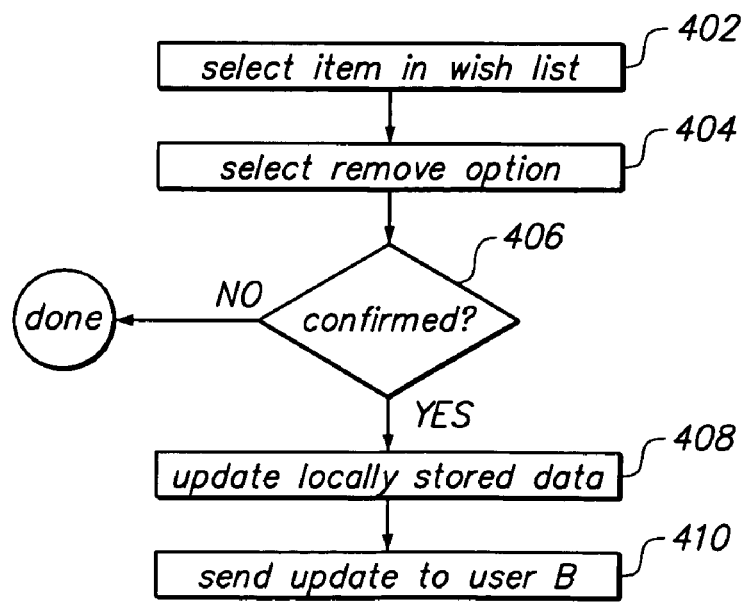
FIG. 4 is a flowchart illustrating the removal of an item from the wish list according to one embodiment.

FIG. 4 is a flowchart illustrating the removal of an item from the wish list according to one embodiment. In this example, User A first selects an item in the wish list (402). Once the item is selected, the user is offered an option to remove the item from the wish list. The remove option is provided via a remove button in some embodiments. The user may choose to remove the item by clicking on the remove button (404). The user is given an opportunity to confirm the removal of the item (406). If a user does not confirm the removal of the item, nothing is to be done and the process completes without removing any items. If the user confirms the removal of the item, locally stored wish list data is then updated to reflect the change (408). The IM application of User A then sends an update to User B (410).

Figure 5:
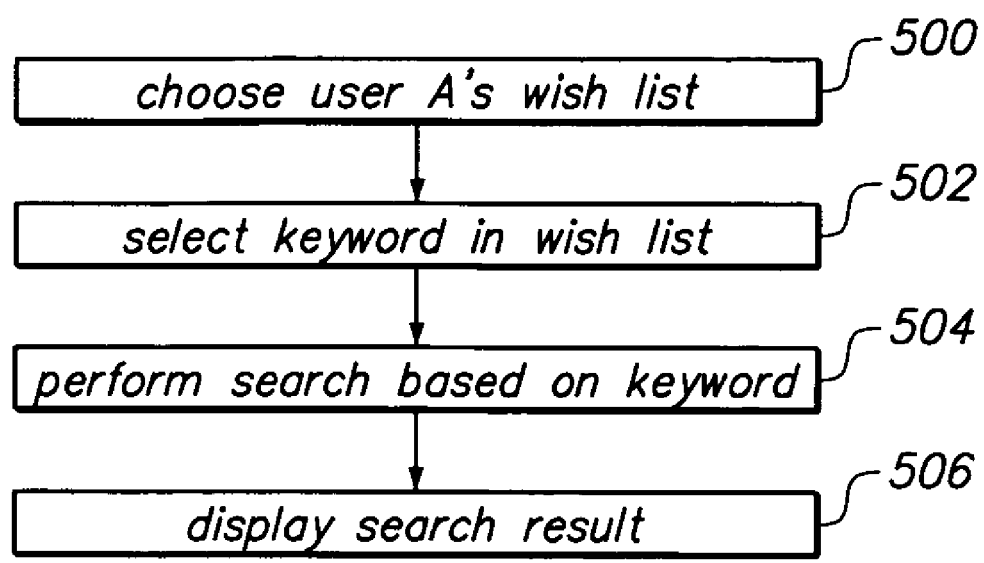
FIG. 5 is a flowchart illustrating the display of User A's wish list to User B, according to one embodiment.

Although User B's IM application may display User A's wish list as soon as an update or alert is received, it is preferable for the IM application to notify User B in a less obtrusive manner, such as by changing an icon or by displaying a dialogue box. In some embodiments, no indication of change is given to User B, although if User B chooses to view User A's wish list, the information displayed will be up to date. FIG. 5 is a flowchart illustrating the display of User A's wish list to User B, according to one embodiment. At the beginning of the process, User B chooses to view User A's wish list (500). User B is given the option to view the wish list via a menu option, a button, or any other appropriate interface in various embodiments. In this embodiment, the wish list includes one or more search phrases User A used to conduct searches. The search phrases are displayed in User B's environment-specific window. User B selects one such key word shown in the wish list (502). User B's IM application then performs a search based on the keyword selected (504), preferably in a manner similar to the search initially conducted by User A's IM application in order to obtain search results that are consistent with the search results obtained by User A. The search results are then displayed in User B's user interface window (506).

Techniques for sharing a wish list have been described. In addition to being used in instant messaging sessions between two users, the techniques described herein are also applied to instant messaging or chat sessions that include three or more users.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of sharing information in an instant messaging environment, comprising the computer-implemented steps of:

providing an instant messaging interface for a first instant messaging application, wherein the instant messaging interface for the first instant messaging application includes a first region and a second region;

providing an instant messaging interface for a second instant messaging application, wherein the instant messaging interface for the second instant messaging application includes a third region and a fourth region;

wherein all content entered in the second region is displayed in substantially real-time in the fourth region;

wherein all content entered in the fourth region is displayed in substantially real-time in the second region;

wherein content in the first region is not automatically displayed in the instant messaging interface for the second instant messaging application;

maintaining a list of items for a user of the first instant messaging application;

receiving user input that selects a portion of content displayed within the first region of the instant messaging interface of the first instant messaging application;

wherein the content displayed in the first region includes a set of items;

wherein the portion selected by the user input includes a subset of items from the first set of items;

in response to said receiving, storing data that reflects said selected portion of content;

wherein the step of storing data includes updating said list of items to include the subset of items; and without affecting content displayed in said second and fourth regions, causing information to be displayed in said third region based on said stored data, wherein said data displayed in said third region is related to said portion of content selected in said first region;

wherein said data displayed in the third region includes information relating to each item in said list of items.

2. The method of claim 1, wherein the step of storing data that reflects said selected portion of content further includes storing data locally on a device running the first instant messaging application.

3. The method of claim 1, additionally comprising the step of:

displaying search results in the first region of the instant messaging interface of the first instant messaging application based on search information entered by a user of the first instant messaging application.

4. The method of claim 3, wherein the step of receiving user input that selects a portion of content displayed within the first region comprises receiving input from the user that selects all of the displayed search results.

5. The method of claim 3, wherein the step of receiving user input that selects a portion of content displayed within the first region comprises receiving input from the user that selects a portion of the displayed search results.

6. The method of claim 3, wherein the step of storing data that reflects said selected portion of content further includes storing the search information entered by the user.

7. The method of claim 1, additionally comprising sending a notification from the first instant messaging application to the second instant messaging application in response to storing the data that reflects said selected portion of content.

8. The method of claim 1, wherein the step of storing data that reflects said selected portion of content further includes storing data that indicates online purchasing information related to the selected portion of content.

9. The method of claim 1 wherein the set of items of the content in the first region includes a list of categories.

10. The method of claim 1, additionally comprising the first instant messaging application receiving a list of users permitted to share content, wherein the user of the second instant messaging application is in the list of users.

11. The method of claim 1, additionally comprising the steps of:
   providing an instant messaging interface for a third instant messaging application, wherein the instant messaging interface for the third instant messaging application includes a fifth region and a sixth region, wherein all content entered in the second region is displayed in substantially real-time in the sixth region, and wherein all content entered in the sixth region is displayed in substantially real-time in the second region; and
   without affecting content displayed in said second and sixth regions, causing information to be displayed in the fifth region based on said stored data, wherein said data displayed in said fifth region is related to said portion of content selected in said first region;
   wherein said data displayed in said fifth region includes information relating to each item in said list of items.

12. The method of claim 1, wherein the selected portion of content is first selected portion of content, the subset of items is a first subset, and the stored data is first stored data, additionally comprising the steps of:
   receiving user input that selects a second portion of content displayed within the first region of the instant messaging interface of the first instant messaging application;
   wherein the second portion selected by the user input includes a second subset of items from the first set of items;
   in response to said receiving the selection of the second portion, storing data that reflects said selected second portion of content;
   wherein the step of storing data that reflects the selected second portion includes updating said list of items to include the second subset of items; and
   without affecting content displayed in said second and fourth regions, causing second information to be displayed in said third region based on said stored data that reflects said selected second portion, wherein said second information displayed in said third region is related to said second portion of content selected in said first region;
   wherein said data displayed in the third region includes information relating to each item in said list of items;
   wherein the second portion of content is different from the first portion of content.

13. The method of claim 1, wherein the maintaining a list of items for a user of the first instant messaging application comprises maintaining a data structure of said list of items.

14. The method of claim 13, wherein the data structure comprises a table.

15. The method of claim 13, wherein the data structure comprises a tree.

16. A computer readable medium comprising one or more sequences of instructions which, when executed by one or more processors, cause the one or more processors to perform the steps of:
   providing an instant messaging interface for a first instant messaging application, wherein the instant messaging interface for the first instant messaging application includes a first region and a second region;
   providing an instant messaging interface for a second instant messaging application, wherein the instant messaging interface for the second instant messaging application includes a third region and a fourth region;
   wherein all content entered in the second region is displayed in substantially real-time in the fourth region;
   wherein all content entered in the fourth region is displayed in substantially real-time in the second region;
   wherein content in the first region is not automatically displayed in the instant messaging interface for the second instant messaging application;
   maintaining a list of items for a user of the first instant messaging application;
   receiving user input that selects a portion of content displayed within the first region of the instant messaging interface of the first instant messaging application;
   wherein the content displayed in the first region includes a set of items;
   wherein the portion selected by the user input includes a subset of items from the first set of items;
   in response to said receiving, storing data that reflects said selected portion of content;
      wherein the step of storing data includes updating said list of items to include the subset of items; and
   without affecting content displayed in said second and fourth regions, causing information to be displayed in said third region based on said stored data, wherein said data displayed in said third region is related to said portion of content selected in said first region;
   wherein said data displayed in the third region includes information relating to each item in said list of items.

17. The computer readable medium of claim 16, wherein the step of storing data that reflects said selected portion of content further includes storing data locally on a device running the first instant messaging application.

18. The computer readable medium of claim 16, additionally comprising one or more sequences of instructions which, when executed by one or more processors, cause the one or more processors to perform the step of:
   displaying search results in the first region of the instant messaging interface of the first instant messaging application based on search information entered by a user of the first instant messaging application.

19. The computer readable medium of claim 18, wherein the step of receiving user input that selects a portion of content displayed within the first region comprises receiving input from the user that selects all of the displayed search results.

20. The computer readable medium of claim 18, wherein the step of receiving user input that selects a portion of content displayed within the first region comprises receiving input from the user that selects a portion of the displayed search results.

21. The computer readable medium of claim 18, wherein the step of storing data that reflects said selected portion of content further includes storing the search information entered by the user.

22. The computer readable medium of claim 16, additionally comprising one or more sequences of instructions which, when executed by one or more processors, cause the one or more processors to perform the step of sending a notification from the first instant messaging application to the second instant messaging application in response to storing the data that reflects said selected portion of content.

23. The computer readable medium of claim 16, wherein the step of storing data that reflects said selected portion of content further includes storing data that indicates online purchasing information related to the selected portion of content.

24. The computer readable medium of claim 16 wherein the content displayed in the first region is a list of categories.

25. The computer readable medium of claim 16, additionally comprising one or more sequences of instructions which, when executed by one or more processors, cause the one or more processors to perform the step of the first instant messaging application receiving a list of users permitted to share content, wherein the user of the second instant messaging application is in the list of users.

26. The computer readable medium of claim 16, additionally comprising one or more sequences of instructions which, when executed by one or more processors, cause the one or more processors to perform the steps of:
  providing an instant messaging interface for a third instant messaging application, wherein the instant messaging interface for the third instant messaging application includes a fifth region and a sixth region, wherein all content entered in the second region is displayed in substantially real-time in the sixth region, and wherein all content entered in the sixth region is displayed in substantially real-time in the second region; and
  without affecting content displayed in said second and sixth regions, causing information to be displayed in the fifth region based on said stored data, wherein said data displayed in said fifth region is related to said portion of content selected in said first region;
  wherein said data displayed in said fifth region includes information relating to each item in said list of items.

27. The computer readable medium of claim 16, wherein the selected portion of content is first selected portion of content, the subset of items is a first subset, and the stored data is first stored data, and additionally comprising one or more sequences of instructions which, when executed by one or more processors, cause the one or more processors to perform the steps of:
  receiving user input that selects a second portion of content displayed within the first region of the instant messaging interface of the first instant messaging application;
  wherein the second portion selected by the user input includes a second subset of items from the first set of items;
  in response to said receiving the selection of the second portion, storing data that reflects said selected second portion of content;
  wherein the step of storing data that reflects the selected second portion includes updating said list of items to include the second subset of items; and
  without affecting content displayed in said second and fourth regions, causing second information to be displayed in said third region based on said stored data that reflects said selected second portion, wherein said second information displayed in said third region is related to said second portion of content selected in said first region;
  wherein said data displayed in the third region includes information relating to each item in said list of items;
  wherein the second portion of content is different from the first portion of content.

28. An apparatus for sharing information in an instant messaging environment, comprising:
  means for providing an instant messaging interface for a first instant messaging application, wherein the instant messaging interface for the first instant messaging application includes a first region and a second region;
  means for providing an instant messaging interface for a second instant messaging application, wherein the instant messaging interface for the second instant messaging application includes a third region and a fourth region;
  wherein all content entered in the second region is displayed in substantially real-time in the fourth region;
  wherein all content entered in the fourth region is displayed in substantially real-time in the second region;
  wherein content in the first region is not automatically displayed in the instant messaging interface for the second instant messaging application;
  means for maintaining a list of items for a user of the first instant messaging application;
  means for receiving user input that selects a portion of content displayed within the first region of the instant messaging interface of the first instant messaging application;
  wherein the content displayed in the first region includes a set of items;
  wherein the portion selected by the user input includes a subset of items from the first set of items;
  means for storing data that reflects said selected portion of content in response to said receiving user input; and
  wherein the step of storing data includes updating said list of items to include the subset of items;
  means for causing information to be displayed in said third region based on said stored data without affecting content displayed in said second and fourth regions, wherein said information displayed in said third region is related to said portion of content selected in said first region;
  wherein said data displayed in the third region includes information relating to each item in said list of items.

* * * * *